United States Patent [19]

Stansberry

[11] 4,152,834

[45] May 8, 1979

[54] SAW HORSE CONSTRUCTION

[76] Inventor: Robert F. Stansberry, 18584 Fitzpatrick, Detroit, Mich. 48228

[21] Appl. No.: 841,883

[22] Filed: Oct. 13, 1977

[51] Int. Cl.[2] .......... F16M 11/00

[52] U.S. Cl. .......... 182/155; 182/181

[58] Field of Search .......... 182/155, 154, 153, 181

[56] References Cited

U.S. PATENT DOCUMENTS

| | | | |
|---|---|---|---|
| 605,469 | 6/1898 | Bourne | 182/176 |
| 965,173 | 7/1910 | Fassler | 182/155 |
| 1,479,209 | 1/1924 | Topp | 182/155 |
| 1,726,662 | 9/1929 | Goff | 182/181 |

*Primary Examiner*—Reinaldo P. Machado
*Attorney, Agent, or Firm*—Dale Austin Winnie

[57] ABSTRACT

A saw horse for general purpose use and comprising a horizontal member having a pair of supporting legs provided at each end, and is conventionally known, and in which the horizontal member and its legs are made out of sheet metal formed to a general channel shape in cross-section, the legs are pinned to the cross member so that they may be folded up to lay flat against the horizontal member, or erected to extend downward and outwardly below it, and with a spring set locking means to fix and keep the legs erect or allow them to be folded up, as and when desired.

1 Claim, 5 Drawing Figures

SAW HORSE CONSTRUCTION

BACKGROUND OF THE INVENTION

Saw horses are commonly known, as used by carpenters and handymen, and as made out of two-by-four lumber and nailed together to provide a horizontal cross member and four supporting legs.

There are two legs that extend downward and outwardly near each end of the horizontal cross member and there is usually a cross brace between the two legs and another brace that extends between the two cross braces under the main cross member, to provide a sturdy construction.

Although several efforts have been made to provide some form of saw horse that can be made more simply and be quickly and easily assembled and put up, and as easily taken apart or folded up for easier storage and carrying around, none have been too readily accepted or commercially successful to date.

What is needed is a construction that will be reasonably light in weight, but sturdy and dependable in use. Also, it is desirable that there be no separate pieces or parts, or as few as possible, since they are so easily lost. And, the saw horse should be sufficiently simple and easy to erect for any child or other generally non-mechanically minded person to be able to set them up for use and take them down again, when and as desired.

Ideally a lightweight, reasonably heavy gauge, galvanized, sheet metal material, in a channel form for strength would provide an inexpensive material and structure from which, with some form of hinge or pivot connection for the legs, and locking means to hold them in place, or release them when desired, should provide a simple construction that will serve most of the necessary and desired purposes for which a saw horse, or a pair of saw horses, are normally needed.

SUMMARY OF THE PRESENT INVENTION

This invention is directed to just such a purpose and has for its principal object to provide a simple means and method for constructing a saw horse for general purpose and use.

The saw horse includes a horizontal member with a pair of supporting legs at each end, as is commonly known. However, the material used to make both the horizontal member and the legs is galvanized or like sheet metal formed to a channel shaped cross section and the legs are pinned to the horizontal member so that they can be folded up and lie parallel against opposite sides of the cross member.

Locking means are provided to hold each leg straight, when erected for use, and to allow each leg to be released so it can be folded up when and as desired.

And, for extreme simplicity, a length of small link chain is used between next adjacent legs, at each end, to prevent them from speading apart an undue amount under load.

The saw horses proposed are sufficiently simple in construction to be relatively inexpensive to make and sell, to be easy to erect for use and fold down for storage, or transportation from one place to another, and are still, at the same time, most adequate and sturdy in construction and capable of all normally accepted uses to which saw horses are normally put.

Further details of construction, providing certain advantages, will be more apparent in the description which follows of the illustrated and a preferred embodiment of the present invention.

DESCRIPTION OF THE DRAWING FIGURES

THE PREFERRED EMBODIMENT

Figure 1:
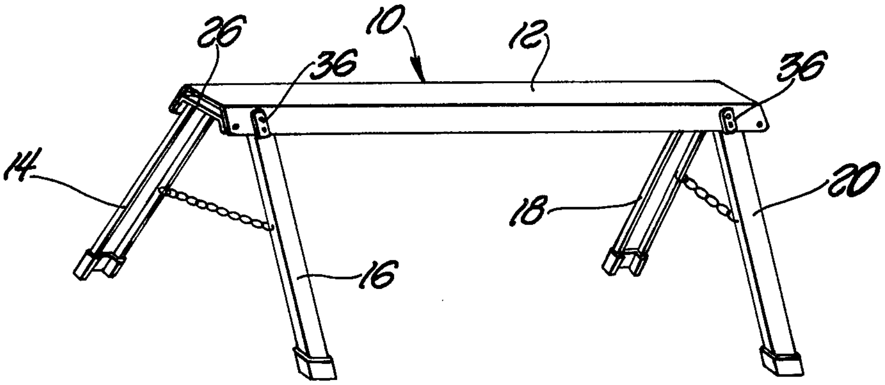
FIG. 1 is a perspective view of a saw horse made in accordance with the teachings and within the spirit of the present invention.

As shown in the first drawing figure, the saw horse 10 of the present invention includes a horizontal member 12, also later referred to as the cross member, which has a pair of supporting legs 14, 16 and 18, 20, at its opposite ends.

The main structural member, that serves as the horizontal or cross member, 12, is formed of a heavy gauge sheet metal to an open channel form as shown best in the second drawing figure. And, it will be noted that the side flanges 22, 24 spread outwardly and down so that the legs 14, 16 and 18, 28, will assume a like outwardly spread and downwardly extended disposition when erected for use.

A corner tie or strap 26 is fastened as by rivet means between the lower corner ends of the flanges 22 and 24, at each end of the cross member 12, to provide added structural rigidity in the cross member and also to serve as an outer limit stop for the supporting legs, when they are erected. And in this latter regard, the cross member of the tie strap is wider than its ends, to provide notches receptive of the legs at each end, and is bent downwardly to better receive the legs as they are being erected.

The saw horse legs 14, 16 and 18, 20, are all alike and similar to the leg 114 shown in the last drawing figure. They are also formed of the same sheet metal as the other cross member part 12, and to a channel shape in cross section, for the added strength such a structural shape and form provides.

They include a rivet pin 28 near the one end that is to be fastened to the cross member part 12 and immediately below that a hole 30, of about the same size. And at their other end they include a boot or shoe 32 to cover the sharp edges of the channel end which might otherwise cause unintentional damage.

Figure 2:
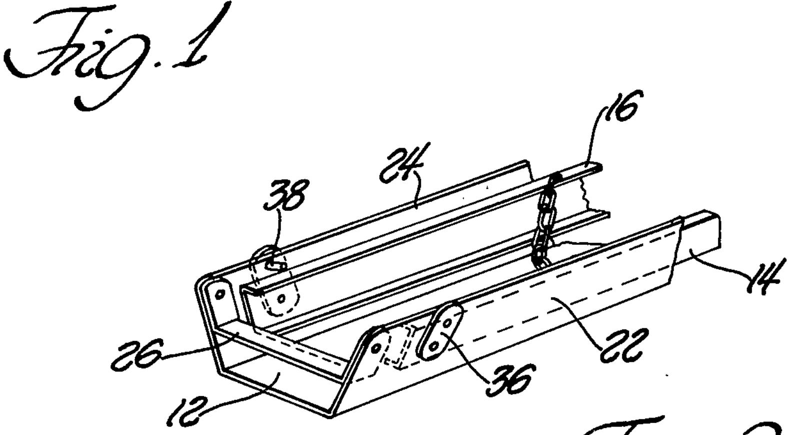
FIG. 2 is an enlarged perspective view of one end of the saw horse shown in the first drawing figure, as turned over and with the legs thereof folded up and into a parallel relation with the cross member.
Figure 3:
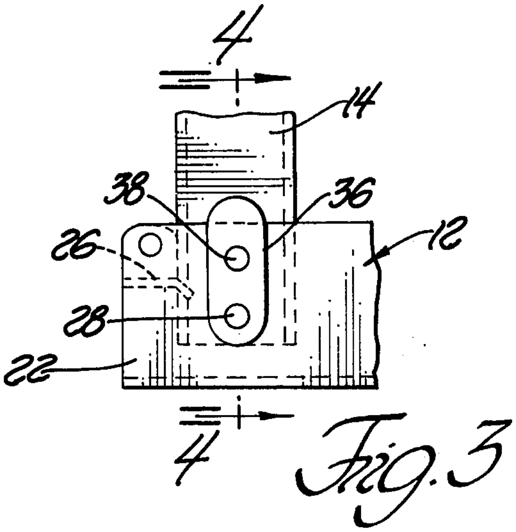
FIG. 3 is a further enlarged side view of one end of the saw horse, as turned over, and with the one leg shown erected, to show the locking means that is used.

As shown in FIGS. 1-3, the legs are pinned to the end of the cross member 12, on the inside of the side flanges 22, 24 and so that they will lie within the larger open channel shaped cross members, when folded up into it, and flat against the side flange to which they are pinned.

Figure 4:
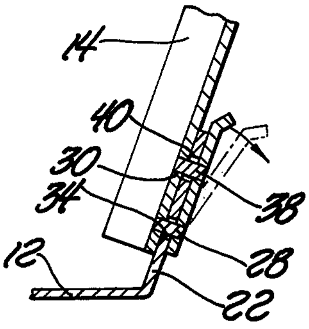
FIG. 4 is a cross sectional view of the saw horse, as turned over, and with the leg shown erected, as seen in FIG. 3 in the plane of line 4—4 and looking in the direction of the arrows.
Figure 5:
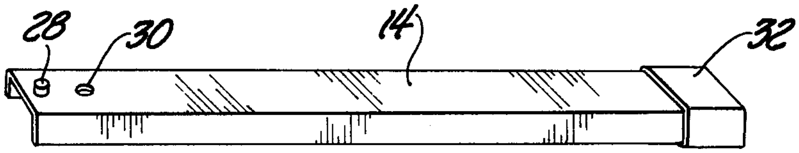
FIG. 5 is a separate perspective view of one of the legs for the saw horse.

Referring to FIGS. 3 and 4, it will be seen that the rivet pin 28 extends through a slightly oversized, but close fitting hole 34 in the side flanges of the cross member and has a spring steel member 36 on the outside of the flanges fixed to the other end. The spring steel member 36 is just long enough to extend slightly beyond the lower edges of the side flange, sufficient to allow a finger tip to pull it outwardly, and another pin 38 is provided on it which is relatively aligned to pass through a hole 40 in the side flanges and for engagement in the holes 30 in the legs, right below where the legs are pinned for free pivoting into either their erected or folded positions.

As a consequence, this provides a very simple and inexpensive locking means, and one which is easy to operate, for use in holding each of the legs erected and in position to support a work load, extending down and outwardly, as shown in the first drawing figure. The spring steel tabs 36 are able to pull the pins 38 from the holes 30 in the legs but are preferably sufficiently tightly held or otherwise limited in resilience so that they will not easily withdraw the locking pins from the holes in the side flanges 22, 24 by which they are aligned for engagement in the other holes.

To prevent the legs 14, 16 and 18, 20 from spreading too much, under load, a short length of small link chain, or the like, 42 is provided between each pair of legs, as shown in FIG. 1. When the legs are folded up in the larger channel shaped cross member the chain merely lies loosely therewithin. Then, when the legs are erected, and as they are extended, they lift out and stretch the chain between them to whatever the predetermined length of the chain is. And this then keeps the legs from being spread any further apart under a load supported on the cross member.

From the foregoing it can be seen that the construction of the proposed saw horse is relatively simple, being made as it is of sheet metal formed to channel shapes to provide the structural members required. And that the means and method of pinning the legs to the cross member, by the use of rivet pins, to allow for the fold up and down movement thereof, is also extremely simple and inexpensive. Further, that the means for pinning the legs, and allowing for the freedom of movement thereof, is also part of the locking means in fixing the spring steel part, with the locking pin on it, to the main cross member relatively next adjacent each of the legs they co-act with.

To collapse the saw horse and put it away for storage, or to transport it from one place to another while folded flat, the tip end of the spring steel members 36 is pulled out to release the locking pins, which hold the legs erect, and to allow them to be folded up into the channel shaped cross member. Or, more properly stated, down into an over-turned cross member, laying as shown in FIG. 2.

And to erect the saw horse, the spring steel members 36 are pulled out while each leg is raised into a position where the locking pins 38 snap into place to hold each leg erect. Then the saw horse can be turned over and placed on its legs, ready for use.

I claim:

1. A saw horse construction, comprising:

a horizontal member of sheet metal construction formed to provide a channel shape in cross-section and with depending and divergently spread side wall flanges extending the full length thereof, a pair of separate and individually pivotal supporting legs provided at each end of said horizontal member and with each of said legs being of channel shape in cross section and having the web section thereof pivotally connected to the inner side wall flanges of said horizontal member, each of said legs being provided with pin means at their upper end for pivotal connection to said side wall flanges and having individual locking means in combination therewith and comprising leaf spring biased detent means fixed to each of said pivot pins and disposed for locking engagement with each of said legs through receptive openings provided in said side wall flanges and each of said legs and aligned when said legs are erect and fully extended, and means for precluding undue spread of said legs when erected and including a length of chain extending between and engaged to oppositely disposed of said legs at each end of said horizontal member together with an end wall strap provided between said side wall flanges at opposite ends of said horizontal member and serving as a stop against pivoted extension of said legs beyond their locking and erected disposition, said end wall straps being fastened to said flanges at the lower corner ends thereof and extending therebetween for providing added structural rigidity within said horizontal member and each strap having opposite ends adjacent said flanges notched to receive and retain said legs, as erected, relatively fixed and locked in supporting position.

* * * * *